US011849358B2

(12) United States Patent
Viering et al.

(10) Patent No.: US 11,849,358 B2
(45) Date of Patent: Dec. 19, 2023

(54) HANDOVER OF A COORDINATED MULTI-POINT CONNECTION

(71) Applicant: NOKIA TECHNOLOGIES OY, Espoo (FI)

(72) Inventors: Ingo Viering, Munich (DE); Panagiotis Spapis, Munich (DE); Alperen Gündogan, Munich (DE); Ahmad Awada, Munich (DE); Jedrzej Stanczak, Wroclaw (PL); Timo Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/119,185

(22) Filed: Dec. 11, 2020

(65) Prior Publication Data
US 2022/0191748 A1 Jun. 16, 2022

(51) Int. Cl.
*H04W 36/00* (2009.01)
*H04W 76/27* (2018.01)
(Continued)

(52) U.S. Cl.
CPC ....... *H04W 36/0066* (2013.01); *H04W 36/08* (2013.01); *H04W 56/001* (2013.01); *H04W 56/0045* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 2011/0170516 A1* | 7/2011 | Hu | H04W 36/00837 370/331 |
| 2013/0142098 A1* | 6/2013 | Kwon | H04W 52/367 370/311 |

(Continued)

OTHER PUBLICATIONS

3GPP TS 36.300 V16.3.0 (Sep. 2020), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Sep. 2020.

(Continued)

*Primary Examiner* — Alex Skripnikov
*Assistant Examiner* — Pamit Kaur
(74) *Attorney, Agent, or Firm* — Robert P. Michal, Esq.; Carter, DeLuca & Farrell LLP

(57) ABSTRACT

Certain example embodiments provide systems, methods, apparatuses, and computer program products for a handover of a coordinated multi-point connection. For example, certain embodiment may transfer a first coordinated multi-point connection (e.g., a further enhanced multiple input multiple output (FeMIMO) connection) to a second coordinated multi-point connection where the network may instruct the UE to not perform at least one random access procedure. The first coordinated multi-point connection may be controlled by a first cell (the serving cell) where the UE is ready to receive from and transmit to a first set of cells that comprises the serving cell and one or more non-serving cells. After handover, the second coordinated multi-point connection may be controlled by a previous non-serving cell, and the UE may be ready to receive from and transmit to a second set of cells that comprises the previous non-serving cell.

20 Claims, 4 Drawing Sheets

(51) Int. Cl.
 *H04W 36/08* (2009.01)
 *H04W 56/00* (2009.01)

(56) References Cited

U.S. PATENT DOCUMENTS

| | | | |
|---|---|---|---|
| 2016/0227503 A1* | 8/2016 | Dalsgaard | H04L 5/0078 |
| 2019/0174372 A1 | 6/2019 | Comstock | |
| 2019/0230545 A1* | 7/2019 | Liou | H04W 16/28 |
| 2020/0314716 A1* | 10/2020 | Kim | H04W 8/08 |
| 2022/0053388 A1* | 2/2022 | Kim | H04W 36/00837 |

OTHER PUBLICATIONS

Samsung, "Revised WID: Further enhancements on MIMO for NR," RP-202024, 3GPP TSG RAN Meeting #89e, Electronic Meeting, Sep. 14-18, 2020.

* cited by examiner

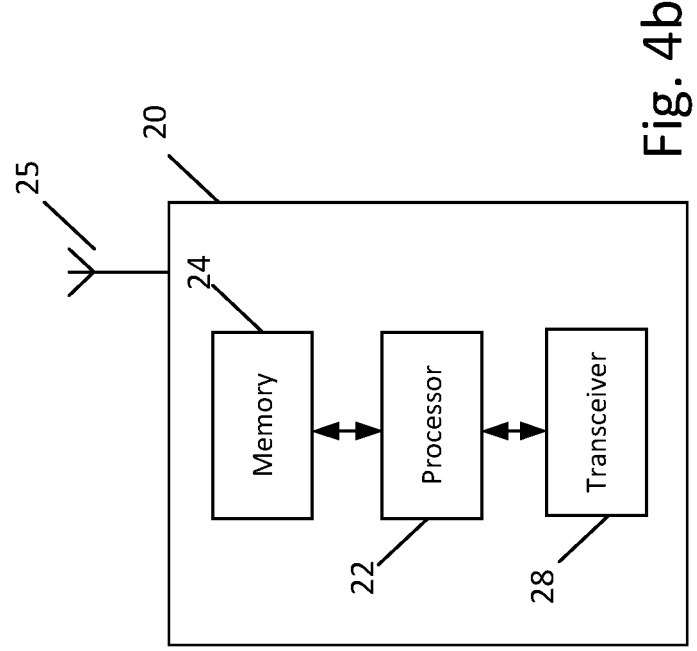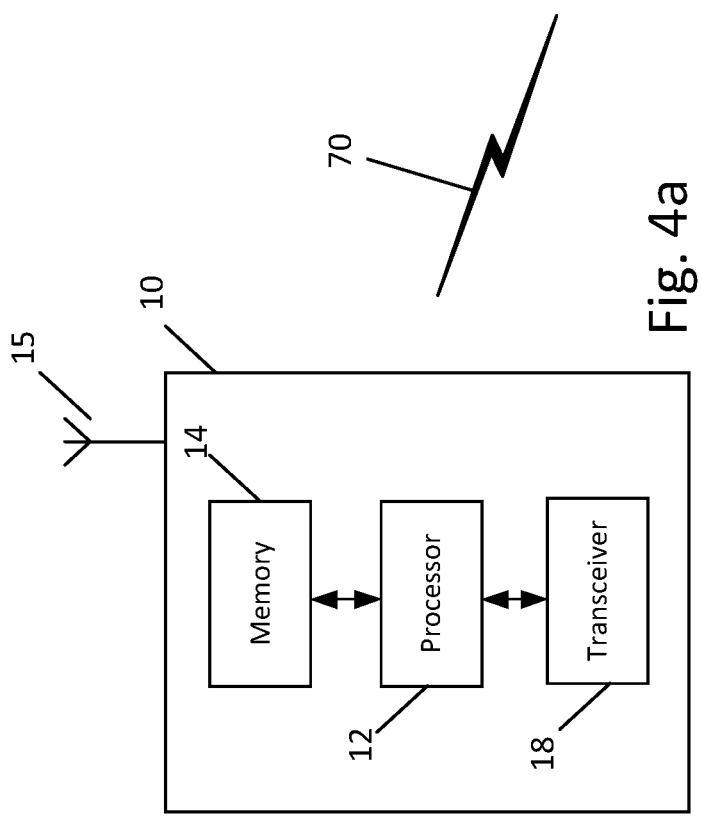

HANDOVER OF A COORDINATED MULTI-POINT CONNECTION

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for handover of a coordinated multi-point connection.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include sending, by a network node to a user equipment, a radio resource control reconfiguration message defining a handover from a first cell to a second cell. The first cell may initially be a serving cell for the user equipment and the second cell may initially be a coordinated multi-point cell for the user equipment. The network node may be associated with the first cell. The radio resource control reconfiguration message may comprise an instruction to not perform a random access channel procedure for the handover from the first cell to the second cell and to reuse a timing advance of the second cell. Additionally, or alternatively, the radio resource control configuration message may include an instruction to not perform the random access channel procedure for a setup of a new coordinated multi-point cell for the user equipment and to reuse a timing advance of the first cell. The method may include receiving, from the user equipment, a radio resource control reconfiguration complete message. The first cell may no longer be the serving cell, the second cell may no longer be the coordinated multi-point cell, and the second cell may be the serving cell when the reconfiguration complete message is received.

In a variant, the coordinated multi-point cell may include a further enhanced multiple input multiple output cell or the coordinated multi-point cell may include a new further extended multiple input multiple output cell. In a variant, the method may further include sending, to the user equipment, scheduling information after receiving the radio resource control reconfiguration complete message. In a variant, the method may further include receiving, from the user equipment, failure information and performing one or more actions based on the failure information.

According to a second embodiment, a method may include receiving, by a user equipment, a radio resource control reconfiguration message defining a handover from a first cell to a second cell. In a variant, the first cell may initially be a serving cell for the user equipment and the second cell may initially be a coordinated multi-point cell for the user equipment. In a variant, the radio resource control reconfiguration message may include an instruction to not perform a random access channel procedure for a handover from the first cell to the second cell and to reuse a timing advance of the second cell. Additionally, or alternatively, the radio resource control configuration message may include an instruction to not perform the random access channel procedure for a setup of a new coordinated multi-point cell for the user equipment and to reuse a timing advance of the first cell.

The method may include applying a configuration for the second cell without performing the random access channel procedure and with reusing the timing advance for the first cell or the timing advance of the second cell. The method may include sending, to the first cell or the second cell, a radio resource control reconfiguration complete message. The first cell may no longer be the serving cell, the second cell may no longer be the coordinated multi-point cell, and the second cell may be the serving cell when the radio resource control reconfiguration complete message is sent.

In a variant, the coordinated multi-point cell may include a further enhanced multiple input multiple output cell or the coordinated multi-point cell may include a new further extended multiple input multiple output cell. In a variant, the method may further include decoding the radio resource control reconfiguration message. In a variant, the applying may further include applying the configuration after the decoding. In a variant, the decoding may further include decoding the radio resource control reconfiguration message without detaching from the first cell. In a variant, the method may further include receiving, from the first cell or the second cell, scheduling information after sending the radio resource control reconfiguration complete message.

In a variant, the method may further include determining that the user equipment has not received scheduling information from the second cell after the handover from the first cell to the second cell, and sending failure information to the first cell. In a variant, the method may further include determining to continue receiving data from the first cell while sending the radio resource control reconfiguration complete message and while waiting for scheduling information from the second cell. In a variant, the method may further include determining, for a control resource set index, that a demodulation reference signal for physical downlink control channel receptions is quasi co-located with a synchronization signal block or channel state information reference signal that is configured as an active transmission configuration indicator state or as a quasi-co-location source for a downlink reference signal indicated by an active transmission configuration indicator state for one or more other control resource set indexes for the second cell.

A third embodiment may be directed to an apparatus including at least one processor and at least one memory comprising computer program code. The at least one memory and computer program code may be configured, with the at least one processor, to cause the apparatus at least to perform the method according to the first embodiment or the second embodiment, or any of the variants discussed above.

A fourth embodiment may be directed to an apparatus that may include circuitry configured to cause the apparatus to perform the method according to the first embodiment or the second embodiment, or any of the variants discussed above.

A fifth embodiment may be directed to an apparatus that may include means for performing the method according to the first embodiment or the second embodiment, or any of the variants discussed above. Examples of the means may include one or more processors, memory, and/or computer program codes for causing the performance of the operation.

A sixth embodiment may be directed to a computer readable medium comprising program instructions stored thereon for causing an apparatus to perform at least the method according to the first embodiment or the second embodiment, or any of the variants discussed above.

A seventh embodiment may be directed to a computer program product encoding instructions for causing an apparatus to perform at least the method according to the first embodiment or the second embodiment, or any of the variants discussed above.

BRIEF DESCRIPTION OF THE DRAWINGS

For proper understanding of example embodiments, reference should be made to the accompanying drawings, wherein:

FIG. 4a illustrates an example block diagram of an apparatus, according to an embodiment; and FIG. 4b illustrates an example block diagram of an apparatus, according to another embodiment.

DETAILED DESCRIPTION

Figure 1:
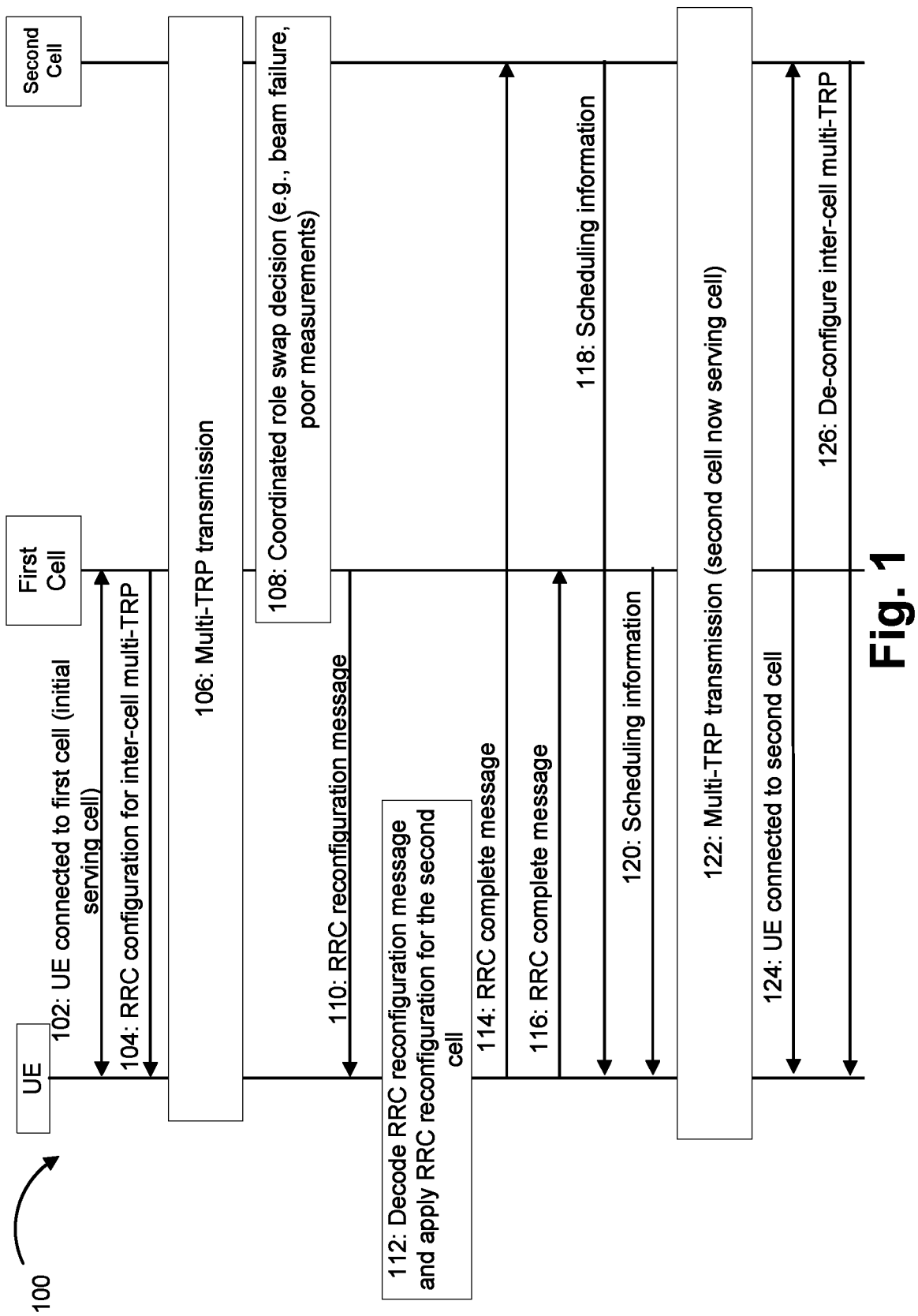
FIG. 1 illustrates an example of handover of a coordinated multi-point connection, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for handover of a coordinated multi-point connection is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Certain aspects of NR may include inter-cell multi-transmission and reception point (multi-TRP or mTRP) transmission and layer 1 (L1) and/or layer 2 (L2) centric inter-cell mobility. In certain scenarios, a UE may move from a source cell to a target cell and the UE may be initially connected to the source cell. The source and target cells may be controlled by the same centralized unit (CU), or by the same distributed unit (DU), but may be using different physical cell identifiers (PCIs), which may be encoded in their reference signals (RSs). If the UE enters the cell edge area between source and target cells, certain aspects of NR may use certain operational modes. As a first operational mode, mTRP may include a source cell and target cell serving the UE simultaneously and coherently (e.g., using coherent joint transmission). mTRP may be based on an "intra-DU" case, where the source cell and target cell may be controlled by the same DU. As a second operational mode, L1 and/or L2-centric mobility may include the target cell being prepared and/or configured such that the source cell can easily switch to a beam of the target cell with lower layer procedures. More specifically, certain intra-cell beam management procedures on a medium access control (MAC) layer may be extended to allow reuse of these mechanisms for beams of neighboring cells. In this context, mobility may not refer to a change in the serving cell (and thereby the PCell), and the UE may not apply the radio resource control (RRC) configuration of the target cell (e.g., no handover in the Layer 3 sense is executed). The target cell in certain cases may also be referred to as a coordinated multi-point (CoMP) cell, or as a further enhanced multiple input multiple output (FeMIMO) cell. In some cases, the target cell may be referred as an inter-cell multi-TPR cell, a non-serving cell (e.g., the cell has different PCI than the current serving cell), a cell configured for inter-PCI communication, a cell configured for inter-PCI mobility, a cell configured for dynamic point selection, or a cell configured for inter-PCI point selection. The target cell may be a cell that a UE is configured to communicate with, e.g., configured to at least monitor and/or receive physical downlink control channel (PDCCH). Furthermore, in certain cases a (multi-) connection between the UE and a source and target cell may be referred to as a CoMP connection or a FeMIMO connection.

In NR, there may be various multi-TRP architectures. In certain architectures, a first TRP (TRP1) may be controlled by a cell 1, e.g., a source cell, and a second TRP (TRP2) controlled by a cell 2, e.g., a target cell. TRP1 and TRP2 are distinguished via different PCIs. Each TRP may send data via one of several beams. In a first architecture, the two cells may be controlled by the same distributed unit (an "intra-DU" architecture). The cells may be tightly coordinated, based on using a single MAC entity. In a second architecture, the two cells may be controlled by different DUs, but a common CU (an "inter-DU, but intra-CU" case). In this case, the lower layer entities (e.g., up to the radio link control (RLC) layer) may be physically separated, and coordination may be accomplished by the common CU via an F1 interface. Another architecture may be a "monolytic" architecture, where the cells may be controlled by different CUs. Coordination between the cells may have to be done in a distributed way via, e.g., an Xn interface linking different network nodes.

Some embodiments described herein may provide for a handover of a coordinated multi-point connection (e.g., in scenarios where a UE moves outside of a coverage area of an initial serving cell where it has to handover to a neighboring cell to operate as a serving cell). For example, certain embodiments may transfer a first coordinated multi-point connection (e.g., a further enhanced multiple input multiple output (FeMIMO) connection) to a second coordinated multi-point connection where the network may instruct the UE to not perform at least one random access procedure. The first coordinated multi-point connection may be controlled by a first cell (the serving cell) where the UE is ready to receive from and transmit to a first set of cells that comprises the serving cell and one or more non-serving cells, e.g., CoMP cells or FeMIMO cells. A UE that is ready to receive from and transmit to the first set of cells may be capable of receiving from and transmitting to the first set of cells simultaneously for mTRP. Or, for L1 and/or L2-centric mobility, the UE may be capable of changing the current cell quickly (e.g., without delay or additional signaling, or with reduced delay or signaling) when receiving corresponding scheduling information from the current cell.

After handover, the second coordinated multi-point connection may be controlled by a previous non-serving cell (e.g., CoMP cell or FeMIMO cell), and the UE may be ready to receive from and transmit to a second set of cells that comprises the previous non-serving cell. The at least one random access procedure that the UE is instructed to not perform may be associated with the serving cell and/or a non-serving cell. In addition, the instruction may comprise an indication that the UE may continue using the timing advance of a cell from the first set of cells.

FIG. 1 illustrates an example signal diagram 100 of handover of a coordinated multi-point connection, according to some embodiments. As illustrated, the example 100 includes a UE, a first cell, and a second cell. In the example 100, the first cell may initially operate as a serving cell, and the second cell may initially operate as a coordinated multi-point cell (e.g., a non-serving cell) and may be a target cell. In certain embodiments, a further enhanced multiple input multiple output (FeMIMO) connection may be an example of a coordinated multi-point connection and a further enhanced multiple input multiple output cell may be an example of a coordinated multi-point cell. A further enhanced multiple input multiple output connection may include mTRP transmission or L1 and/or L2-centric mobility. A FeMIMO cell may be used for a non-serving cell in a FeMIMO connection (e.g., the FeMIMO cell may have a different PCI than a serving cell, and the FeMIMO cell may not be configured as cell with the servingcellIndex parameter).

As illustrated at 102, the UE may be connected to the first cell operating as the initial serving cell. As illustrated at 104, the first cell may send, to the UE, an RRC configuration for inter-cell multi-TRP. For example, the serving cell may configure inter-cell multi-TRP transmission with a target cell (e.g., based on measurement reports received by the UE). As illustrated at 106, the UE, the first cell, and the second cell may perform operations for multi-TRP transmission. For example, the UE may be served by both cells simultaneously (or separately in the L1 and/or L2 centric mobility case), but still using the first cell as the serving cell. As illustrated at 108, the first cell and the second cell may perform a coordinated role swap decision (e.g., due to beam failure, poor measurements, etc.). For example, the network (in particular the serving cell, maybe in coordination with the target cell) may determine that the target cell is to be the serving cell, such that the connection can survive without the original serving cell (first cell) in case the serving cell degrades and/or disappears. This may be based on measurement reports received by the UE.

As illustrated at 110, the first cell may send, to the UE, an RRC reconfiguration message. In certain embodiments, the RRC reconfiguration message may include an instruction to the UE to not perform a random access channel (RACH) procedure for a handover to the second cell, and to reuse the timing advance of the second cell, which may be known since the second cell is already operating as a CoMP or FeMIMO cell. For example, the RRC reconfiguration message may include an instruction for the UE to not perform the RACH procedure to the target cell (second cell in the example 100), and to reuse the timing advance from the target cell (as an inter-cell mTRP cell or a cell prepared for L1 and/or L2-centric mobility). Additionally, or alternatively, the RRC reconfiguration message may include an RRC configuration for a new coordinated multi-point connection (e.g., inter-cell mTRP connection). Additionally, or alternatively, the RRC reconfiguration message may include an instruction to the UE to not perform a RACH for setup of a new coordinated multi-point cell (e.g., for setup of the first cell as a non-serving cell), and to reuse a timing advance of the first cell. For example, the RRC reconfiguration message may include an instruction for the UE to not perform a RACH to set up a new coordinated multi-point connection, and to reuse the timing advance from the serving cell.

As illustrated at 112, the UE may decode the RRC reconfiguration message and may apply the RRC reconfiguration for the second cell. For example, the UE may decode the RRC reconfiguration message and may apply the target cell configuration. In certain embodiments, the decoding may be performed without detaching from the serving cell, in a manner similar to make-before-break procedures. After decoding and applying the RRC reconfiguration, the UE may be connected to the first cell as a non-serving cell (e.g., a coordinated multi-point cell) and may be connected to the second cell as the serving cell.

As illustrated at 114 and 116, the UE may send an RRC reconfiguration complete message to both the first cell and the second cell, which may increase a reliability of certain embodiments described herein. As illustrated at 118 and 120, the second cell, as the new serving cell, may send scheduling information to the UE. For example, the scheduling information may be carried on physical downlink control channel (PDCCH) and may be sent with an identifier, such as a cell radio network temporary identifier (C-RNTI). As illustrated at 122, the UE, the first cell, and the second cell may perform operations for multi-TRP transmission, in a manner similar to that described at 106. As illustrated at 124, the UE may be connected to the second cell. For example, the mTRP transmission may be resumed as controlled by the second cell as the serving cell rather than the first cell as the serving cell. As illustrated at 126, the second cell may de-configure the inter-cell multi-TRP. For example, the former serving cell (the first cell) may be de-configured as the UE proceeds towards the second cell (before first cell is no longer reachable by the UE).

In this way, certain embodiments described herein may provide for a UE to communicate with both, the second cell (the serving cell after performance of certain operations described above) and the first cell (the previous serving cell), even after applying the new target configuration. More specifically, this can be used to send the RRC complete message to both the first cell and the second cell (rather than just the second cell), which may improve the reliability of a communications network (e.g., if the second cell experiences stability issues).

In certain embodiments, the UE may send the RRC complete message to just the target cell, and the UE may not receive the PDCCH from the target cell within a pre-defined time duration T (configured by the network) or after N number of attempts at sending the RRC complete message and waiting, for a time period, for the PDCCH with a new C-RNTI. In this case, the UE may send failure information to the previous serving cell if available. For example, if the timer T310 for radio link failure (RLF) has not expired, the UE may send an indication of the failure of the serving cell switch to the previous serving cell (the first cell in the example 100). Using this indication, the previous serving cell may perform one or more actions, which may include reconfiguring the UE to communicate with the previous serving cell. In certain embodiments, a UE with two receivers may continue to receive data from the initial serving cell (the first cell in the example 100) using a previous C-RNTI while the UE is sending the RRC complete message to the target cell (the second cell in the example 100), and while waiting to receive a PDCCH with a new C-RNTI from the target cell. This may reduce or eliminate interruption time during the handover execution.

In certain embodiments, when the UE is instructed and/or configured to perform a RACH-less handover and/or to skip a RACH procedure in any of the above-described embodiments, the UE may determine a quasi-co-location (QCL) source reference signal (RS) for the demodulation reference signal (DMRS) for PDCCH receptions for a control resource set (CORESET) (e.g., CORESET with index #0). The UE may determine the QCL source RS in an implicit manner. The UE may determine for a control resource set (CORESET) #0 (index #0), that the demodulation reference signal (DMRS) for PDCCH receptions in the CORESET may be quasi co-located with the synchronisation signal block (SSB). SSB may refer to synchronization signal/physical broadcast channel (SS/PBCH) block. A cell may broadcast one or more SSBs and the SSBs may be identified and referred to by an index. CORESET may refer to a set of physical (frequency) resources used for transmitting PDCCH and/or downlink control information to a UE. The SSB may be configured as the QCL source for one of the downlink reference signal (DL-RS) (such as CSI-RS or SSB) indicated active transmission configuration indicator (TCI) states for CORESET indexes (other than CORESET #0) for the target cell. The SSB that may be configured as a QCL source for DMRS for PDCCH receptions in the CORESET #0 may be determined from the CORESET index configured for the target cell so that the lowest or highest (or one of the CORESET index, determined by UE or configured by network) CORESET index value is selected and the QCL source SSB of one of the downlink (DL) reference signal (RS) indicated by active TCI states (e.g., channel state information-reference signal (CSI-RS) or tracking reference signal (TRS)/TRS CSI-RS) for that CORESET is used. In other words, for a CORESET with index 0 (in the target cell or after the serving cell switch), the UE may determine that DMRS antenna ports for PDCCH receptions in the CORESET are quasi co-located with the SSB that is the QCL source RS for the DL RS configured by an active TCI state for a CORESET (e.g., with an index other than zero). This may be for one of the CORESETs indexes where the CORESET index may be selected based on the highest or lowest (or one of the index values or the UE may select one of the index values) CORESET index value. In a further example, the UE may determine the QCL source RS for (DMRS) for PDCCH receptions in the CORESET based at least on one other CORESET. The CORESET #0 and the monitoring of PDCCH (e.g., common search space configuration for system information block 1 (SIB 1) reception) may be configured by the information provided in the master information block (MIB) which may be carried by the PBCH.

If the target cell is configured with N CORESETs (e.g., 3), and up to N CORESETs can be activated with a TCI state, the UE may drop the highest (or lowest or one or more of the index values) CORESET index value from the configuration because the UE may determine to use the CORESET #0 configuration for the target cell. Dropping a CORESET may refer to a UE assuming that the CORESET with the said value index is not considered by the UE as configured, the UE assuming that the CORESET configuration is removed, the UE not having to consider the CORESET as configured, or the CORESET not being used for monitoring PDCCH. In certain embodiments, the quasi-co-located SSB may be determined based on the DL RS in an active TCI state (e.g., up to 2 TCI states may be configured) that provides the QCL typeD source (or, alternatively, types A, B, or C). In one example, the network may configure which CORESET index value the UE should drop.

As an example, the network may have configured the UE with CORESET indexes #0 and #1 for the first cell and CORESET indexes #2 and #3 for the second cell for PDCCH reception. Each CORESET may be configured with an active TCI state that provides one or more QCL source RS (e.g., CSI-RS and/or SSB) for the PDCCH DMRS for the respective CORESET. When the UE is provided with a cell switch instruction to not perform a RACH procedure and/or use the target cell's timing advance, the UE may determine the CORESET #0 transmission from the second cell with the determination that the PDCCH DMRS for the CORESET is quasi-co-located with the SSB that is the QCL source for the active TCI state for either the CORESET #2 or CORESET #3 of the second cell. In some examples, the UE may assume the DL RS (directly and not from the QCL source) indicated by the active TCI state for a CORESET as the QCL source for DMRS for PDCCH reception in another CORESET (e.g., CORESET #0).

The QCL determination between two reference signals may provide the UE with the information that specific properties are shared between the reference signals. The properties can include, e.g., antenna port quasi-co-location. The UE may be configured with a list of up to M TCI state configurations within, e.g., the parameter PDSCH-Config. The TCI state configurations may be used to decode physical downlink shared channel (PDSCH) according to a detected PDCCH with downlink control information (DCI) intended for the UE and the given serving cell. M may depend on the UE capability maxNumberConfiguredTCIstatesPerCC. Each TCI state may include parameters for configuring a quasi-co-location relationship between one or two downlink reference signals and the DMRS ports of the PDSCH, the DMRS port of PDCCH, or the CSI-RS port(s) of a CSI-RS resource. The quasi-co-location relationship may be configured by the parameter qcl-Type1 for the first DL RS, and qcl-Type2 for the second DL RS. For the case of two DL RSs, the QCL types may not be the same, regardless of whether the references are to the same DL RS or different DL RSs. The quasi-co-location types corresponding to each DL RS may be provided by the parameter qcl-Type in the QCL-Info information element (IE) and may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; 4) 'QCL-TypeD': {Spatial Rx parameter}.

One example benefit of certain aspects related to QCL determinations may include at least partial resolution of the ambiguity of the PDCCH DMRS QCL assumption for the reception of control information for CORESET #0. As an example, there may be clear rules when using the RACH procedure. In case of using a RACH procedure, the UE may determine the PDCCH DMRS to be quasi-co-located with the SSB indicated by one of the RACH procedures (e.g., the most recent RACH procedure). Since the UE may already be configured with at least one CORESET and with at least one active TCI state, this configuration can be leveraged.

In certain embodiments, the RRC reconfiguration message may include a conditional handover (CHO) command (e.g., the RRC reconfiguration message may be sent as a conditional reconfiguration along with a trigger condition). The UE may evaluate the trigger condition (e.g., at 112 above), and may apply the target configuration (and send the RRC complete message) once the trigger condition expires. One example benefit of the CHO may include that the RRC reconfiguration message can be sent early, when the UE is still in range of the source cell, without risking the loss of role swap decision. In this way, the conditional reconfiguration may provide mobility robustness.

As described above, FIG. 1 is provided as an example. Other examples are possible, according to some embodiments.

Figure 2:
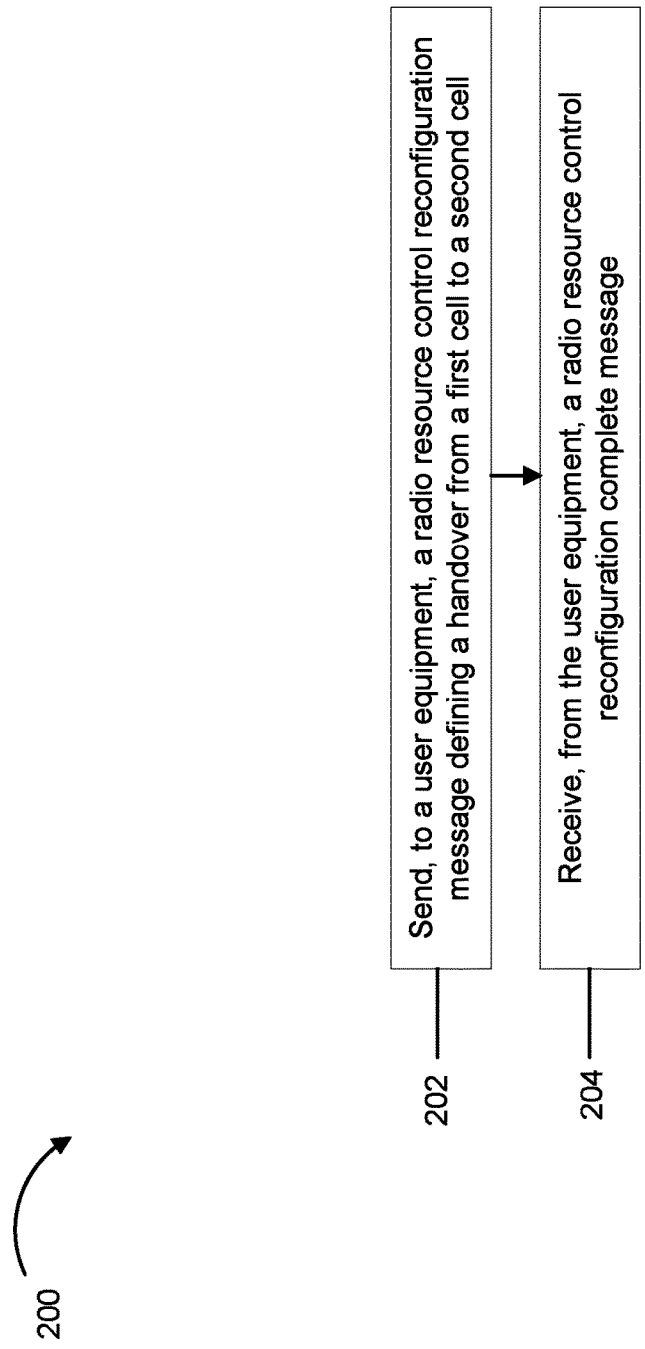
FIG. 2 illustrates an example flow diagram of a method, according to some embodiments.

FIG. 2 illustrates an example flow diagram of a method 200, according to some embodiments. For example, FIG. 2 may illustrate example operations of a network node (e.g., apparatus 10 illustrated in, and described with respect to, FIG. 4*a*). Specifically, FIG. 2 may illustrate operations of a network node associated with a cell that is initially a serving cell (e.g., the first cell of FIG. 1). Some of the operations illustrated in FIG. 2 may be similar to some operations shown in, and described with respect to, FIG. 1.

In an embodiment, the method may include, at 202, sending, to a user equipment, a radio resource control reconfiguration message defining a handover from a first cell to a second cell, for example, in a manner similar to that at 110 of FIG. 1. The first cell may initially be a serving cell for the user equipment and the second cell may initially be a coordinated multi-point cell for the user equipment. The network node may be associated with the first cell. In certain embodiments, the radio resource control reconfiguration message may comprise an instruction to not perform a random access channel procedure for a handover from the first cell to the second cell and to reuse a timing advance of the second cell. Additionally, or alternatively, the radio resource control configuration message may include an instruction to not perform the random access channel procedure for a setup of a new coordinated multi-point cell for the user equipment and to reuse a timing advance of the first cell. The method may include, at 204, receiving, from the user equipment, a radio resource control reconfiguration complete message, for example, in a manner similar to that at 116 of FIG. 1. The first cell may no longer be the serving cell, the second cell may no longer be the coordinated multi-point cell, and the second cell may be the serving cell when the reconfiguration complete message may be received.

The method illustrated in FIG. 2 may include one or more additional aspects described below or elsewhere herein. In some embodiments, the coordinated multi-point cell may include a further enhanced multiple input multiple output cell or the coordinated multi-point cell may include a new further extended multiple input multiple output cell. In some embodiments, the method may further include sending, to the user equipment, scheduling information after receiving the radio resource control reconfiguration complete message, for example, in a manner similar to that at 120 of FIG. 1. In some embodiments, the method may further include receiving, from the user equipment, failure information and performing one or more actions based on the failure information.

As described above, FIG. 2 is provided as an example. Other examples are possible according to some embodiments.

Figure 3:
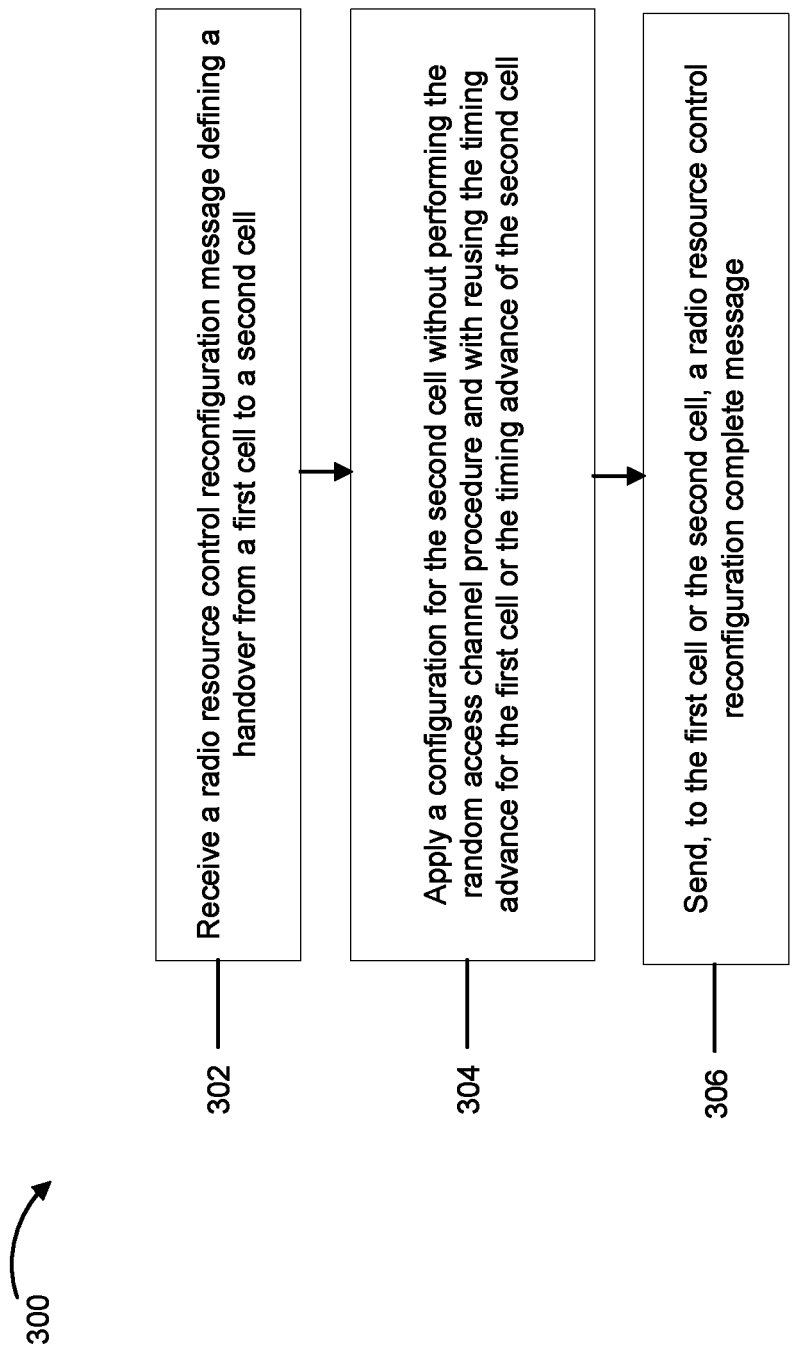
FIG. 3 illustrates an example flow diagram of a method, according to some embodiments.

FIG. 3 illustrates an example flow diagram of a method 300, according to some embodiments. For example, FIG. 3 may illustrate example operations of a UE (e.g., apparatus 20 illustrated in, and described with respect to, FIG. 4*b*). Some of the operations illustrated in FIG. 3 may be similar to some operations shown in, and described with respect to, FIG. 1.

In an embodiment, the method may include, at 302, receiving a radio resource control reconfiguration message defining a handover from a first cell to a second cell, for example, in a manner similar to that described at 110 of FIG. 1. In certain embodiments, the first cell may initially be a serving cell for the user equipment and the second cell may initially be a coordinated multi-point cell for the user equipment. In certain embodiments, the radio resource control reconfiguration message may include an instruction to not perform a random access channel procedure for a handover from the first cell to the second cell and to reuse a timing advance of the second cell. Additionally, or alternatively, the radio resource control configuration message may include an instruction to not perform the random access channel procedure for a setup of a new coordinated multi-point cell for the user equipment and to reuse a timing advance of the first cell.

The method may include, at 304, applying a configuration for the second cell without performing the random access channel procedure and with reusing the timing advance for the first cell or the timing advance of the second cell, for example, in a manner similar to that at 112 of FIG. 1. The method may include, at 306, sending, to the first cell or the second cell, a radio resource control reconfiguration complete message, for example, in a manner similar to that at 114 and/or 116 of FIG. 1. The first cell may no longer be the serving cell, the second cell may no longer be the coordinated multi-point cell, and the second cell may be the serving cell when the radio resource control reconfiguration complete message is sent.

The method illustrated in FIG. 3 may include one or more additional aspects described below or elsewhere herein. In some embodiments, the coordinated multi-point cell may include a further enhanced multiple input multiple output cell or the coordinated multi-point cell may include a new further extended multiple input multiple output cell. In some embodiments, the method may further include decoding the radio resource control reconfiguration message, for example, in a manner similar to that at 112 of FIG. 1. In some embodiments, the applying at 304 may further include applying the configuration after the decoding, for example, in a manner similar to that at 112 of FIG. 1. In some embodiments, the decoding may further include decoding the radio resource control reconfiguration message without detaching from the first cell. In some embodiments, the method may further include receiving, from the first cell or the second cell, scheduling information after sending the radio resource control reconfiguration complete message, for example, in a manner similar to that at 118 and/or 120 of FIG. 1.

In some embodiments, the method may further include determining that the user equipment has not received scheduling information from the second cell after the handover from the first cell to the second cell, and sending failure information to the first cell. In some embodiments, the method may further include determining to continue receiving data from the first cell while sending the radio resource control reconfiguration complete message and while waiting for scheduling information from the second cell. In some embodiments, the method may further include determining, for a control resource set index, that a demodulation reference signal for physical downlink control channel receptions is quasi co-located with a synchronization signal block or channel state information reference signal that is configured as an active transmission configuration indicator state or as a quasi-co-location source for a downlink reference signal indicated by an active transmission configuration indicator state for one or more other control resource set indexes for the second cell.

As described above, FIG. 3 is provided as an example. Other examples are possible according to some embodiments.

FIG. 4a illustrates an example of an apparatus 10 according to an embodiment. In an embodiment, apparatus 10 may be a node, host, or server in a communications network or serving such a network. For example, apparatus 10 may be a network node, TRP, satellite, base station, a distributed unit, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G. In some embodiments, apparatus 10 may be associated with a serving cell, a coordinated multi-point cell (e.g., a further enhanced multiple input multiple output cell), and/or the like.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), Multe- Fire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-2. For instance, apparatus 10 may be controlled by memory 14 and processor 12 to perform the method of FIG. 2.

FIG. 4b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4b.

As illustrated in the example of FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1 and 3. For instance, in one embodiment, apparatus 20 may be controlled by memory 24 and processor 22 to perform the method of FIG. 3.

In some embodiments, an apparatus (e.g., apparatus 10 and/or apparatus 20) may include means for performing a method or any of the variants discussed herein, e.g., a method described with reference to FIGS. 2 and 3. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is handover of a coordinated multi-point connection in a seamless manner with reduced interruption, increased robustness of the handover, maintaining of throughput without fallback to single connectivity, and/or reduced signaling. Accordingly, the use of some example embodiments results in improved functioning of communications networks and their nodes and, therefore constitute an improvement at least to the technological field of coordinated multi-point connection handover, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

| PARTIAL GLOSSARY | |
|---|---|
| CoMP | Coordinated Multi-Point |
| CU | Central Unit |
| DAPS | Dual Active Protocol Stack |
| DU | Distributed Unit |
| FeMIMO | Further enhanced Multiple Input Multiple Output |
| HO | Handover |
| MAC | Media Access Control |
| MBB | Make Before Break |
| mTRP | inter-cell multi Transmission and Reception Point |
| PCI | Physical Cell Identifier |
| PDCCH | Physical Downlink Control Channel |
| PDCP | Packet Data Convergence Protocol |
| RACH | Random Access (Channel) |
| RRC | Radio Resource Control |
| RS | Reference Signal |
| SS/PBCH | Synchronization Signal/Physical Broadcast Channel |

We claim:

1. An apparatus, comprising:
   at least one processor; and
   at least one memory including computer program code,
   wherein the at least one memory and the computer program code are configured to, with the at least one processor, cause the apparatus at least to:
   receive a radio resource control reconfiguration message defining a handover from a first cell to a second cell, wherein the first cell is initially a serving cell for the apparatus using a timing advance for the first cell and the second cell is initially a coordinated multi-point cell for the apparatus using a timing advance for the second cell,
       wherein the radio resource control reconfiguration message comprises an instruction to not perform a random access channel procedure for the handover from the first cell to a second cell and to reuse the timing advance for the second cell, or
       wherein the radio resource control configuration message comprises an instruction to not perform the random access channel procedure for a setup of a new coordinated multi-point cell for the apparatus and to reuse the timing advance for the first cell;
   apply a configuration for the second cell without performing the random access channel procedure and with reusing the timing advance for the first cell or the timing advance of the second cell; and
   send, to the first cell or the second cell, a radio resource control reconfiguration complete message, wherein after the radio resource control reconfiguration complete message is sent the first cell is no longer the serving cell, the second cell is no longer the coordinated multi-point cell, and the second cell is the serving cell.

2. The apparatus according to claim 1, wherein the coordinated multi-point cell comprises a further enhanced multiple input multiple output cell or the coordinated multi-point cell comprises a new further extended multiple input multiple output cell.

3. The apparatus according to claim 1, wherein the at least one memory and the computer program code are configured to, with the at least one processor, further cause the apparatus at least to:
   decode the radio resource control reconfiguration message; and
   wherein the at least one memory and the computer program code are configured to, with the at least one processor, further cause the apparatus, when applying the configuration, at least to:
   apply the configuration after the decoding.

4. The apparatus according to claim 3, wherein the at least one memory and the computer program code are configured to, with the at least one processor, further cause the apparatus, when decoding the radio resource control reconfiguration message, at least to:
   decode the radio resource control reconfiguration message without detaching from the first cell.

5. The apparatus according to claim 1, wherein the at least one memory and the computer program code are configured to, with the at least one processor, further cause the apparatus at least to:
   receive, from the first cell or the second cell, scheduling information after sending the radio resource control reconfiguration complete message.

6. The apparatus according to claim 1, wherein the at least one memory and the computer program code are configured to, with the at least one processor, further cause the apparatus at least to:
   determine that the apparatus has not received scheduling information from the second cell after the handover from the first cell to the second cell; and
   send failure information to the first cell.

7. The apparatus according to claim 1, wherein the at least one memory and the computer program code are configured to, with the at least one processor, further cause the apparatus at least to:
   determine to continue receiving data from the first cell while sending the radio resource control reconfiguration complete message and while waiting for scheduling information from the second cell.

8. The apparatus according to claim 1, wherein the at least one memory and the computer program code are configured to, with the at least one processor, further cause the apparatus at least to:
   determine, for a control resource set index, that a demodulation reference signal for physical downlink control channel receptions is quasi co-located with a synchronization signal block or channel state information reference signal that is configured as an active transmission configuration indicator state or as a quasi-co-location source for a downlink reference signal indicated by an active transmission configuration indicator state for one or more other control resource set indexes for the second cell.

9. An apparatus, comprising:
at least one processor; and
at least one memory including computer program code,
wherein the at least one memory and the computer program code are configured to, with the at least one processor, cause the apparatus at least to:
send, to a user equipment, a radio resource control reconfiguration message defining a handover from a first cell to a second cell, wherein the first cell is initially a serving cell for the user equipment using a timing advance for the first cell and the second cell is initially a coordinated multi-point cell for the user equipment using a timing advance for the second cell,
wherein the radio resource control reconfiguration message comprises an instruction to not perform a random access channel procedure for a handover from the first cell associated with the apparatus to the second cell and to reuse the timing advance for the second cell, or
wherein the radio resource control configuration message comprises an instruction to not perform the random access channel procedure for a setup of a new coordinated multi-point cell for the user equipment and to reuse the timing advance for the first cell; and
receive, from the user equipment, a radio resource control reconfiguration complete message, wherein the first cell is no longer the serving cell, the second cell is no longer the coordinated multi-point cell, and the second cell is the serving cell when the reconfiguration complete message is received.

10. The apparatus according to claim 9, wherein the coordinated multi-point cell comprises a further enhanced multiple input multiple output cell or the new coordinated multi-point cell comprises a new further extended multiple input multiple output cell.

11. The apparatus according to claim 9, wherein the at least one memory and the computer program code are configured to, with the at least one processor, further cause the apparatus at least to:
send, to the user equipment, scheduling information after receiving the radio resource control reconfiguration complete message.

12. The apparatus according to claim 9, wherein the at least one memory and the computer program code are configured to, with the at least one processor, further cause the apparatus at least to:
receive, from the user equipment, failure information; and
performing one or more actions based on the failure information.

13. A method, comprising:
receiving, by a user equipment, a radio resource control reconfiguration message defining a handover from a first cell to a second cell, wherein the first cell is initially a serving cell for the user equipment using a timing advance for the first cell and the second cell is initially a coordinated multi-point cell for the user equipment using a timing advance for the second cell,
wherein the radio resource control reconfiguration message comprises an instruction to not perform a random access channel procedure for a handover from the first cell to the second cell and to reuse the timing advance for the second cell, or
wherein the radio resource control configuration message comprises an instruction to not perform the random access channel procedure for a setup of a new coordinated multi-point cell for the user equipment and to reuse the timing advance for the first cell;
applying a configuration for the second cell without performing the random access channel procedure and with reusing the timing advance for the first cell or the timing advance of the second cell; and
sending, to the first cell or the second cell, a radio resource control reconfiguration complete message, wherein after the radio resource control reconfiguration complete message is sent the first cell is no longer the serving cell, the second cell is no longer the coordinated multi-point cell, and the second cell is the serving cell.

14. The method according to claim 13, wherein the coordinated multi-point cell comprises a further enhanced multiple input multiple output cell or the coordinated multi-point cell comprises a new further extended multiple input multiple output cell.

15. The method according to claim 13, further comprising:
decoding the radio resource control reconfiguration message; and
wherein the applying of the configuration further comprises:
applying the configuration after the decoding.

16. The method according to claim 15, wherein the decoding of the radio resource control reconfiguration message further comprises:
decoding the radio resource control reconfiguration message without detaching from the first cell.

17. The method according to claim 13, further comprising:
receiving, from the first cell or the second cell, scheduling information after sending the radio resource control reconfiguration complete message.

18. The method according to claim 13, further comprising:
determining that the user equipment has not received scheduling information from the second cell after the handover from the first cell to the second cell; and
sending failure information to the first cell.

19. The method according to claim 13, further comprising:
determining to continue receiving data from the first cell while sending the radio resource control reconfiguration complete message and while waiting for scheduling information from the second cell.

20. The method according to claim 13, further comprising:
determining, for a control resource set index, that a demodulation reference signal for physical downlink control channel receptions is quasi co-located with a synchronization signal block or channel state information reference signal that is configured as an active transmission configuration indicator state or as a quasi-co-location source for a downlink reference signal indicated by an active transmission configuration indicator state for one or more other control resource set indexes for the second cell.

* * * * *